United States Patent [19]

Presley

[11] 4,121,601

[45] Oct. 24, 1978

[54] FLOW COMPENSATED DIVIDER VALVE

[75] Inventor: Glen T. Presley, Wichita, Kans.

[73] Assignee: Cross Manufacturing, Inc., Lewis, Kans.

[21] Appl. No.: 715,442

[22] Filed: Aug. 18, 1976

[51] Int. Cl.² ............................................. G05D 11/02
[52] U.S. Cl. ..................................... 137/101; 137/118
[58] Field of Search .......................... 137/98, 101, 118

[56] References Cited

U.S. PATENT DOCUMENTS

| 2,862,512 | 12/1958 | Johanesen | 137/98 |
| 3,060,953 | 10/1962 | Harbidge | 137/101 |
| 3,348,563 | 10/1967 | Sidles, Jr. | 137/101 |
| 3,703,186 | 11/1972 | Brewer | 137/118 |
| 3,722,524 | 3/1973 | Engelmann | 137/101 |
| 3,924,650 | 12/1975 | Parquet | 137/101 |
| 5,973,580 | 8/1976 | Ueda | 137/118 |

FOREIGN PATENT DOCUMENTS

| 2,043,003 | 3/1972 | Fed. Rep. of Germany | 137/101 |
| 4,421,631 | 6/1969 | Japan | 137/101 |
| 509,967 | 7/1939 | United Kingdom | 137/101 |
| 527,958 | 10/1940 | United Kingdom | 137/101 |

Primary Examiner—William R. Cline
Assistant Examiner—H. Jay Spiegel
Attorney, Agent, or Firm—Edward L. Brown, Jr.

[57] ABSTRACT

A hydrostatic parallel circuit drive system on a vehicle which drives a pair of hydraulic wheel motors which are supplied by a single pump source through a divider valve which senses the flow rate to each of the motors, and when the flow rates to the two motors vary sufficiently, the divider valve restricts the excess flow so that one wheel cannot spin and consume the entire flow to the system.

5 Claims, 5 Drawing Figures

FLOW COMPENSATED DIVIDER VALVE

BACKGROUND OF THE INVENTION

With the advance of recent hydraulic technology, numerous forms of hydrostatic drive systems have been developed for all types of vehicles in either two or four wheel drive systems. Parallel type circuits have some inherent advantages wherein a single pump source supplies two or more wheel motors through a parallel rather than a series flow path. Differential motor drive speed, inherent in all turning vehicles, is of no problem since the individual wheel motors are independently driven through a parallel flow path. The basic disadvantage of a parallel flow system is that if one wheel motor loses traction and begins to spin, it will absorb all of the flow in the system, robbing any torque from the remaining wheels. One system to solve this spin-out problem has been a valve and corresponding circuitry which shifts the flow from a parallel path to a series path locking all wheels together while the machine is in a spin-out condition. This system has its disadvantages in that it is manual in operation and more importantly, that it has a maximum efficiency of 50% tractive effort as compared with a parallel system. Another prior art method is the use of individual flow restrictors or flow limiters in the lines to each of the motors causing an excess back prressure if one of the wheels spins-out. However, such a system is equally inefficient since one wheel can accept one-half of the total system flow before the restrictor means begins to function. Other similar prior art methods are shown in U.S. Pat. No. 3,641,765 and U.S. Pat. No. 3,405,776.

The present invention utilizes a single flow responsive divider valve which divides the flow from a single source to a pair of motors regardless of the flow rate and allows a prearranged flow differential between the motors for cornering without decreasing the system efficiency. The divider valve of the present invention includes a shuttle spool having a pair of fixed orifices in the divided flow path to the respective motors so that the flow rates to those motors can be sensed due to pressure drops thereacross. Whenever the flow rate to one motor sufficiently exceeds the flow rate to the remaining motor, the overall pressure differential on the shuttle spool causes the spool to shift and the variable orifice accepting the excess flow begins to restrict flow to maintain the two flows proportional. The fixed orifices are tapered in one direction so that the reverse flow through the valve is essentially free flowing.

Therefore, the principal object of the present invention is to provide an improved hydrostatic parallel drive system for vehicles which permits differential operation without a substantial efficiency loss.

Another object of the present invention is to provide a hydrostatic spin-out valve which is unaffected by the flow levels of the system.

A further object of the present invention is to provide a flow divider valve which is free flowing in the opposite direction.

The invention will be more readily understood when the following description of certain embodiments is read in connection with the accompanying drawings in which.

Figure 1:
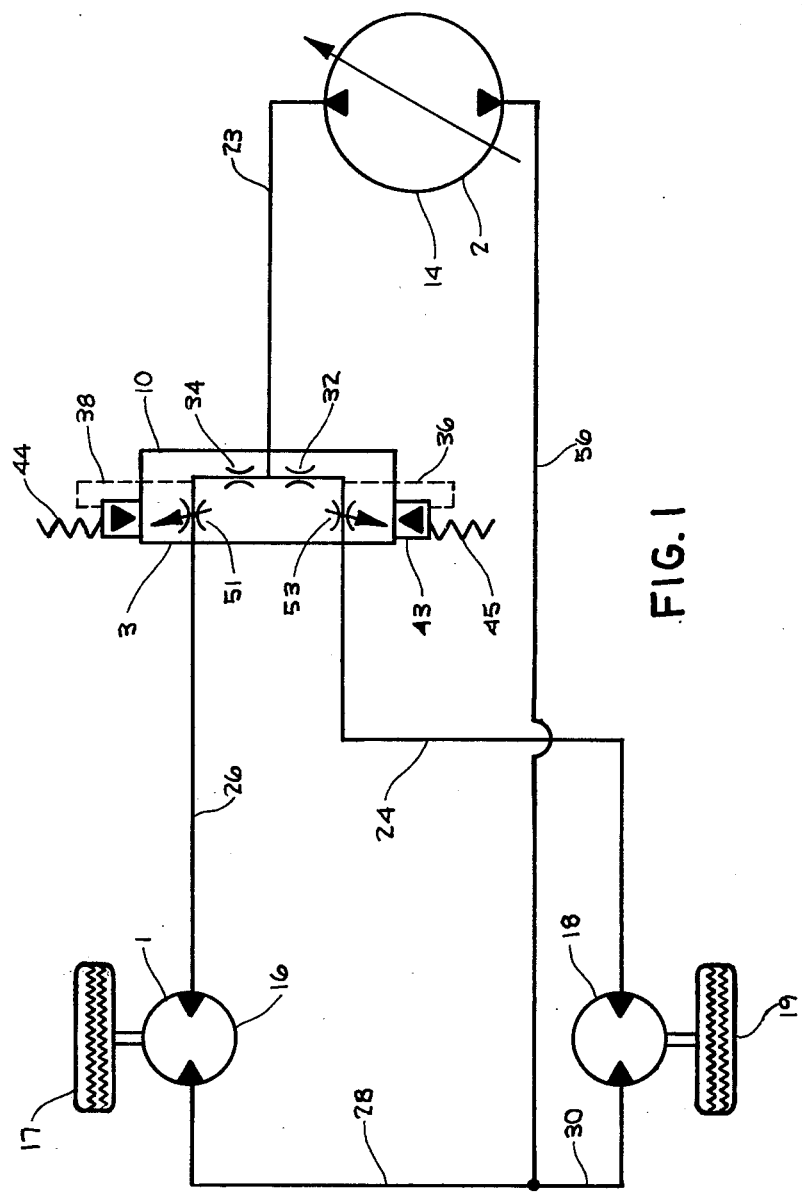
FIG. 1 is a schematic drawing of a two-wheel drive system incorporating the present invention.
Figure 2:
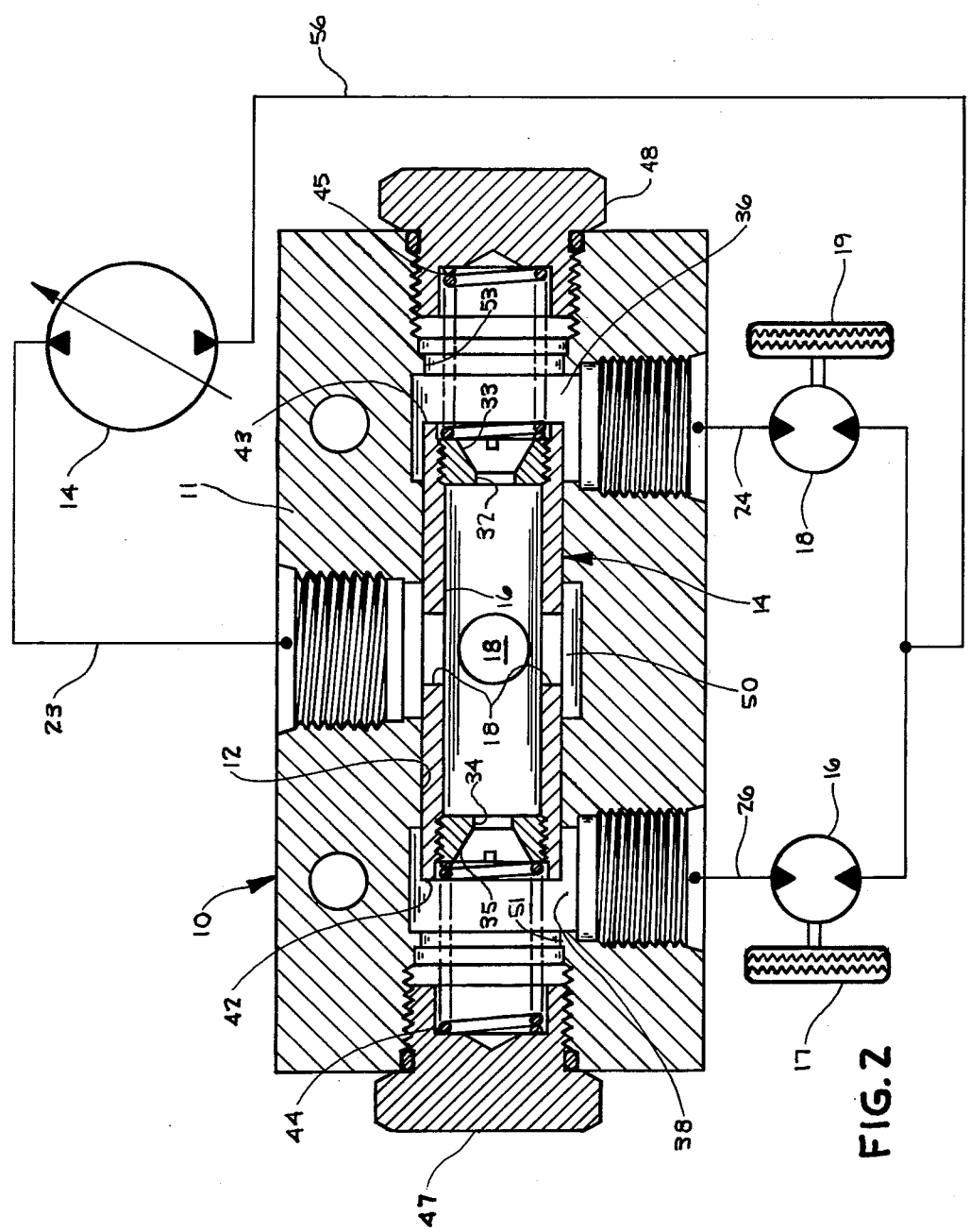
FIG. 2 is a partially schematic diagram with the divider valve shown in longitudinal section with tapered fixed restrictions.

FIG. 1 shows a general arrangement of the novel drive system with the divider valve generally identified by reference numeral 10. The system is supplied by a variable displacement pump 14 which drives two wheel motors 16 and 18, which in turn drive two vehicle wheels 17 and 19, respectively. The pump discharge flow in line 23 enters the divider valve 10, is proportionally split and flows out lines 26 and 24 to motor 16 and 18 respectively. Divider valve 10, shown in detail in FIG. 2, comprises a valve body 11 having a central bore 12 passing therethrough. Intersecting bore 12 are a pair of outlet cavities 38 and 36 which connect to motors 16 and 18 via lines 26 and 24 respectively. Also intersecting bore 12 intermediate the two outlet cavities is inlet cavity 50 which in turn is connected to the pump discharge via line 23. Positioned in bore 11 is a shuttle spool generally identified by reference numeral 14. Spool 14 has a longitudinal passage 16 throughout its length, with the opposite ends of passage 16 being closed by fixed orifices 34 and 32. Centrally positioned in spool 14 are a plurality of lateral passages 18 circumferentially spaced to allow substantially unrestricted flow from inlet cavity 50 to lateral passage 16. Fixed orifices 32 and 34 have an outward taper 33 and 35 respectively so that reverse flow from outlet cavities 36 and 38 inwardly to longitudinal passage 16 creates a reduced pressure drop as compared with flow from longitudinal passage 16 to outlet cavities 36 and 38. This reduced pressure drop in the working valve is necessary in the FIG. 3 configuration or the divider valves 10 and 10a will fight each other. Positioned on both ends of spool 14 are a pair of compression springs 44 and 45 respectively, both having similar spring forces so that in the absence of a certain pressure differential across spool 14, the springs 44 and 45 maintain the spool in a center unrestricting position, as seen in FIG. 2. The sizing of orifices 32 and 34 and the particular spring rates is determined by the necessary differential flow required in turning for that particular vehicle the system is to be used on. Shuttle spool 14 and its adjoining compression springs 44 and 45 are held in place by a pair of closure plugs 47 and 48 which are threaded in opposite ends of bore 12. Shuttle spool 14 is actuated by differential pressure acting on the opposite ends of the spool 42 and 43 which exceeds the forces of springs 44 and 45. As the end 42 of spool 14 approaches the land portion 51 of bore 12, the flow path into outlet cavity 38 is restricted, thereby functioning as a variable orifice downstream from fixed orifice 34. The opposite end 43 of shuttle spool 14 also functions in a similar manner with land 53 as the spool moves to the right closing the flow path into cavity 36.

OPERATION

Under normal flow conditions, the pump discharge enters the inlet cavity 50 of the valve via line 23 and passes through lateral passages 18 into the longitudinal passage 16 of the shuttle spool and flows equally in both directions. The divided flow passes out the ends of the spool 14 and flows to the wheel motors 16 and 18. As long as the flow requirements of each wheel 17 and 19 remain the same, the shuttle spool 14 will maintain its center position, as seen in FIG. 2, without restricting flow to either motor. In a turning condition of the vehicle; one wheel, 17 for example, will turn at a greater speed than wheel 19, thereby taking an increased flow from outlet cavity 38 from that flowing from outlet cavity 36. The increased flow across fixed restriction 34 creates a greater pressure drop across that restriction than is experienced across restriction 32 at the opposite end of spool 14. The pressure downstream from fixed restriction 34 is felt by the end 42 of shuttle spool 14 while the pressure downstream from restriction 32 is felt by the opposite end 43 of the spool. As the flow rates across restrictions 34 and 32 begin to vary, a force imbalance is created on the spool 14, urging the spool to move in one direction or the other against the force of springs 44 and 45. By sizing fixed orifices 32 and 34 and springs 44 and 45, the divider valve can be designed so that those necessary differential flows to opposite motors required for turning or other minimal variances between the two wheels will be absorbed without restricting any flow across shuttle spool 14. However, when the flow differential to one wheel becomes excessive, as in the case where one wheel has lost its traction, the flow differential will cause the spool 14 to shift in one direction or the other against springs 44 and 45 and restrict the excessive flow so as to maintain sufficient pressure and torque on the opposite wheel. As for example, if wheel 17 lost traction and motor 16 began to overspeed, the flow across fixed restriction 34 would far exceed the flow across restriction 32. The increased pressure drop across restriction 34 would cause the forces downstream acting on end 43 to exceed the forces on the opposite end 42, causing a net force on the spool to the left, sufficient to move shuttle spool 14 against compression spring 44. As the end 42 of the shuttle spool approaches land 51, a variable restriction is created thereby reducing the flow to runaway motor 16. This variable restriction caused by the end 42 of spool 14 will seek a position restricting the flow to motor 16 to a point where the flows to motor 18 and 16 are substantially the same discounting the above mentioned differential flow.

When variable displacement pump 14 reverses the flow so that the pump discharges in line 56 and takes the motor return flow in line 23, the divider valve 10 is now located downstream from wheel motors 16 and 18 and does not function. The pump discharge flow in line 56 is split, flowing in a parallel path to motors 16 and 18 with the motor return flow flowing into divider valve outlet cavities 38 and 36, respectively. In most applications reverse flow is minimal and the divider valve is not necessary.

Figure 5:
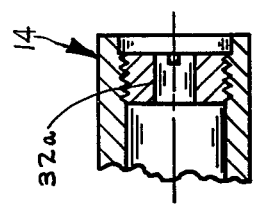
FIG. 5 is a partial section of the shuttle spool with a modified fixed restriction.
Figure 3:
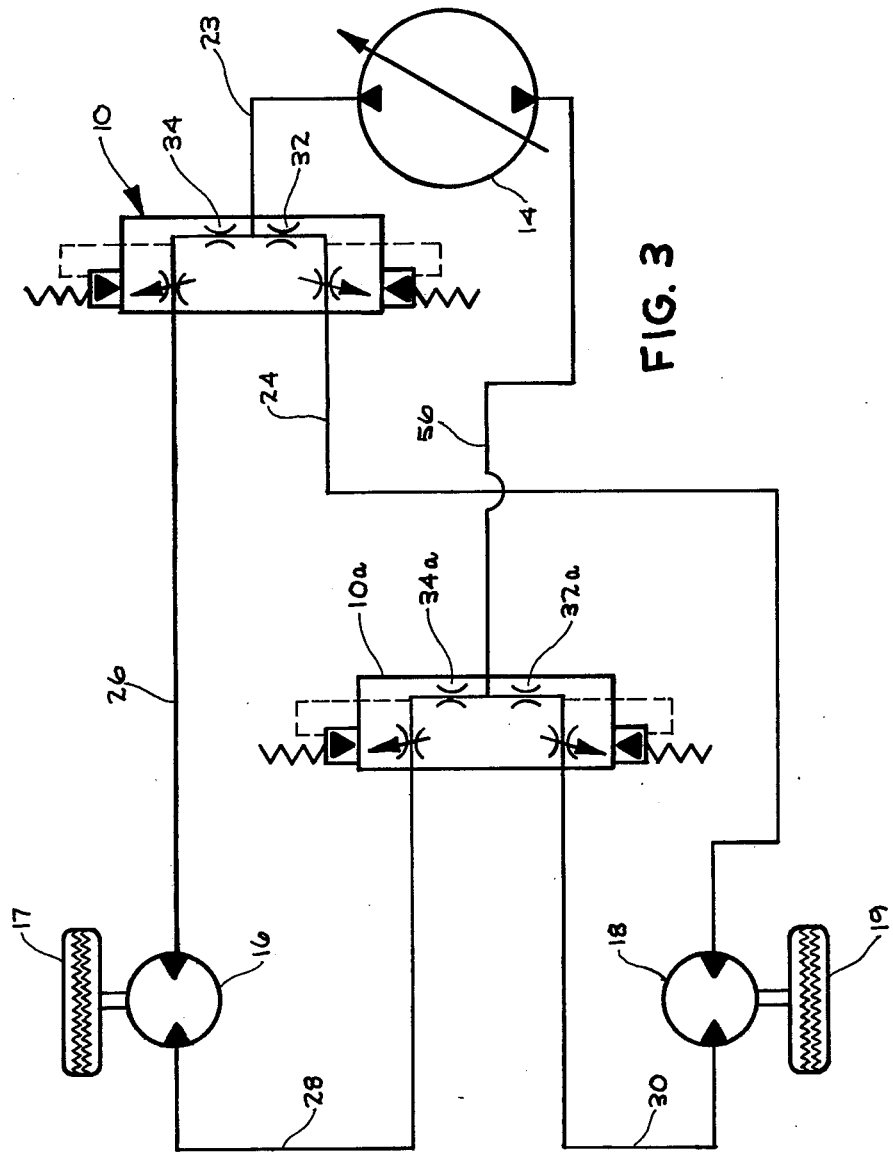
FIG. 3 is a schematic diagram of a two-wheel reversible system incorporating a pair of divider valves for movement in opposite directions.

FIG. 3 is a variation of the system shown in FIGS. 1 and 2 with the addition of a similar divider valve 10a in the reverse circuit. When pump 14 is operating in the reverse direction, line 56 is the pump discharge while line 23 is the pump return line. In the reverse configuration, the pump discharge flow in line 56 enters divider valve 10a and proportions the flow to motors 16 and 18 through lines 28 and 30 respectively. Divider valve 10a thereby becomes functional in a reverse flow condition when one of the wheels of motors 16 and 18 loses its contact with the ground or when the tractive coefficient is very low in such conditions as mud, ice, etc. When pump 14 is operating in its forward condition, line 23 carries the pump discharge to divider valve 10 with proportioned flow going to motors 16 and 18 through lines 26 and 24 respectively. In a forward condition, as just described, divider valve 10a positioned in the return flow path of motors 16 and 18 will not restrict flow in lines 28 and 30 because fixed restrictions 34a and 32a are tapered, as shown in detail in FIG. 2. While there is a pressure drop across tapered restriction 34 in the reverse direction, the pressure drop in the forward direction is greater (flow from passage 16 to cavity 38). Therefore, by reason of the greater pressure drop in the forward direction, divider valve 10 will control flow in the forward direction without any hindrance in the return flow from divider valve 10a. Likewise, divider valve 10a will control flow in the reverse direction without any hindrance from divider valve 10. In circuits where only a single divider valve 10 is used, such as FIG. 1, a tapered fixed orifice is not necessary and a conventional orifice plate 32a, such as seen in FIG. 5, is permissible. The pressure drop across orifice plate 32a would be identical for flow in either direction.

Figure 4:
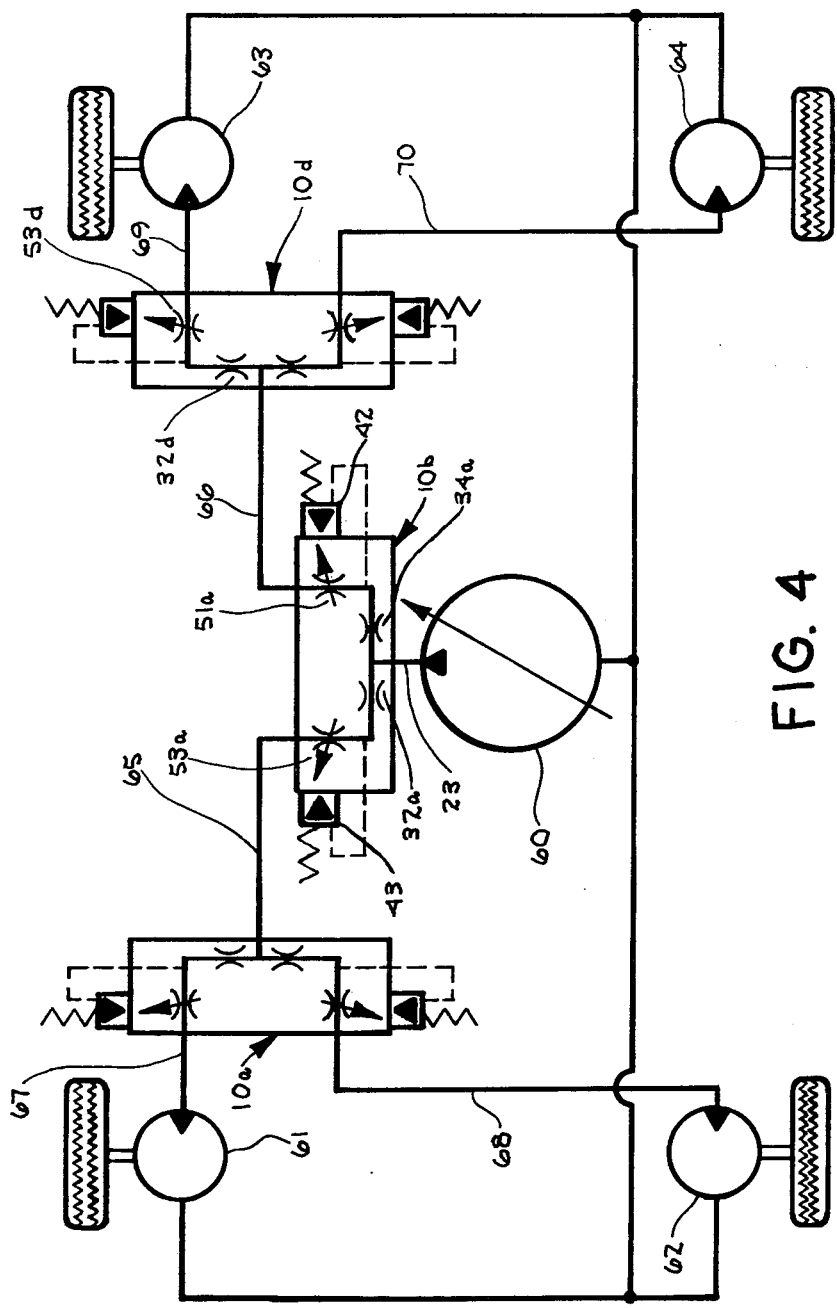
FIG. 4 is a schematic diagram of a four-wheel drive system incorporating three of the divider valves to proportion flow to the four respective motors.

FIG. 4 illustrates the divider valve utilized in a four-wheel drive system supplied by a single pump 60. In this system, three divider valves 10b, 10c and 10d are required. The pump discharge flow in line 23 first enters divider valve 10b and is divided with flow going to the front wheel motors 61 and 62 via line 65 with the remaining flow directed to the rear wheel motors 63 and 64 via line 66. The pump discharge flow in line 65 is again divided by the divider valve 10c proportioning the flow to individual motors 61 and 62 via lines 67 and 68 respectively. The flow in line 66 to the rear wheel motors is also divided by divider valve 10d with proportioned flow to wheel motors 63 and 64 via lines 69 and 70 respectively. If, for example, front wheel motors 61 and 62 would both lose their tractive effort, divider valve 10b would sense the excessive flow across fixed restriction 32a, thereby causing variable restriction 53a to pinch-off the flow in line 65 to the runaway front wheels and maintain the flow in line 65 proportional to the flow in line 66 to the rear wheels. Since the torque requirements of the rear wheels have doubled, the pressure level required to turn the rear wheels will substantially double, all of which is controlled by variable orifice 53a and divider valve 10b. The flow to the rear wheels through line 66 is again divided by divider valve 10d proportioning the flow to each of the wheel motors 63 and 64, respectively. If the vehicle were to lose further traction and lose rear wheel motor 63 along with both front wheels, the system would operate in a similar manner as just described, and in addition variable restriction 53d in divider valve 10d would cut off excess flow to wheel motor 63, thereby maintaining adequate flow to wheel motor 64 at an increased pressure level.

Having described the invention with sufficient clarity to enable those familiar with the art to construct and use it, what is claimed is:

1. A flow compensated divider valve permitting non-restrictive reverse flow therethrough used in reversible hydrostatic drive systems for supplying a pair of wheel motors in parallel from a single pump source comprising:
  a valve body;
  a bore in the body;

first and second outlet cavities intersecting the bore longitudinally thereof and connecting with the first and second motors respectively;

an inlet cavity intersecting the bore intermediate the first and second outlet cavities and connecting with the pump discharge;

a shuttle spool positioned in the valve bore having a longitudinal passage therein;

biasing means on opposite ends of the spool urging the spool toward a neutral non-restrictive position;

a centrally disposed lateral passage through said spool intersecting the longitudinal passage connecting the inlet cavity to the longitudinal spool passage;

a pair of tapered fixed orifice means shaped to provide a greater pressure drop thereacross for flow in one direction than in the other, positioned in the longitudinal spool passage, each orifice means being on opposite sides from the lateral passage providing a greater pressure drop for fluid flow from the lateral passage across said orifice means;

a pair of variable orifices each being downstream of a fixed orifice means, each variable orifice being alternately rstrictive by movement of the shuttle spool against the force of the biasing means; and servo means acting on opposite ends of the shuttle spool against the forces of the biasing means, sensing the pressure drop across each of the fixed orifice means and moving the shuttle spool to restrict flow across one of the variable orifices when the combined pressure differential downstream of the two fixed orifice means exceeds a prearranged level.

2. A flow compensated divider valve as set forth in claim 1, wherein the fixed orifice means are tapered in one direction to have less resistance for reverse flow from the motors to the valve than forward flow from the valve to the motors.

3. A flow compensated divider valve as set forth in claim 1, wherein the fixed orifice means have an enlarging cross section from the lateral passage side of the orifice to the variable orifice side.

4. A flow compensated divider valve as set forth in claim 1, wherein the fixed orifice means having an enlarging cross section from the lateral passage side of the orifice to the variable orifice side with a taper of approximately 10°.

5. A flow compensated divider valve as set forth in claim 1, wherein the fixed orifice means have a tapered cross section enlarging from the lateral passage side of the orifice to the variable orifice side with the taper being between 10° and 30°.

* * * * *